July 23, 1968

L. R. KINSEY 3,393,510

COMPOUND HYDRAULIC BRAKE SYSTEM

Filed Jan. 28, 1966

INVENTOR.
LEWIS R. KINSEY

BY

ATTORNEY

United States Patent Office 3,393,510
Patented July 23, 1968

3,393,510
COMPOUND HYDRAULIC BRAKE SYSTEM
Lewis R. Kinsey, 108 S. 25th St.,
Phoenix, Ariz. 85034
Filed Jan. 28, 1966, Ser. No. 523,719
1 Claim. (Cl. 60—54.5)

ABSTRACT OF THE DISCLOSURE

A compound hydraulic brake system arranged to allow one or more subsystems associated with each individual wheel brake to continue to operate if one or more of the subsystems fail due to breakage or rupture of the fluid system sufficiently serious to prevent operation of the brake.

My invention relates to an improved hydraulic brake system. It relates more in particular to an improved compound hydraulic brake system which will function to permit one or more of the subsystems associated with individual wheels to continue to function if one or more of the subsystems associated with individual wheels should develop hydraulic leaks sufficiently serious to prevent their functioning.

During the last fifty or more years, there has been a very extensive development in brake systems for automobiles. While the use of hydraulic systems was suggested at a relatively early date, early automobiles almost always were equipped with mechanical brakes, and while they had their disadvantages, they seldom had the disadvantage of failing completely. Electrically operated brakes have been suggested and to some extent used, but the problems attending the use of electrically operated brakes have been such that generally speaking electrical brakes are now used only for trailers and the like, and then commonly in association with a hydraulic system. For many years, hydraulic brakes have been used almost exclusively on both passenger automobiles as well as heavy vehicles, such as on-the-road trucks, even though the latter have commonly been actuated by means of compressed air rather than with foot power. Notwithstanding the very great advantages of hydraulic brakes and the many improvements made therein, they will suffer the disadvantage that it is possible for the entire system to fail merely because of the development of a leak someplace in the system. Even compound systems have been suggested in which there is one hydraulic system involving a master cylinder and master piston and a subsystem for each wheel, but even systems of this type, so far as I am aware, have had the disadvantage that a leak in a subsystem could lead to failure of the entire system and represent a very great hazard for the automobile driver.

Accordingly, the principal object of my invention is the provision of a hydraulic brake system in which remaining brakes on uneffected wheels of a vehicle will continue to operate if one or more brakes on individual wheels should cease to operate.

Another object of the invention is the provision of a compound hydraulic brake system in which the brakes on individual wheels will continue to operate even though the brakes on one or more wheels will fail to operate because of leaking in wheel cylinders or in the lines running to the wheel cylinders.

Still another object is the provision of a compound hydraulic brake system in which the system is not compounded in pressure but rather mechanically so that the system operates in a practical way substantially as does a simple conventional brake system, and no special operating or unusual servicing requirements are associated with it.

A further object is the provision of a compound brake system including a master cylinder operating a plurality of floating pistons, and said floating pistons actuate individual wheel cylinders.

Other objects and features of my invention will be apparent from the following detailed description taken with the accompanying drawings wherein.

Figure 2:
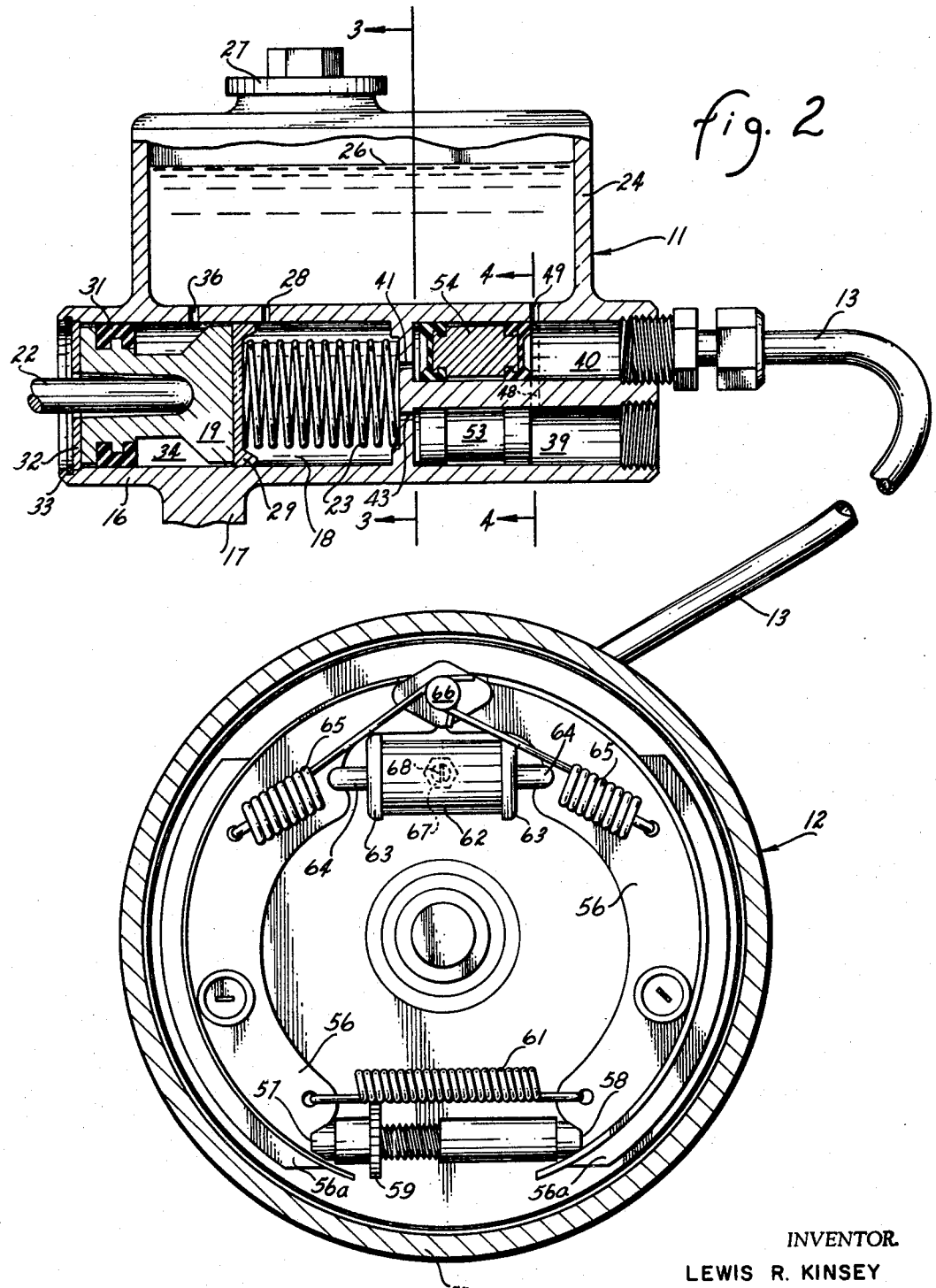
FIG. 2 is an enlarged fragmentary sectional view taken along line 2—2 of FIG. 1.

FIGS. 3 and 4 are transverse sectional views taken along the lines 3—3 and 4—4 of FIG. 2;

FIG. 5 is a sectional view similar to FIG. 4 but showing one of the floating pistons in modified position; and FIG. 6 is a fragmentary sectional view taken along the line 6—6 of FIG. 5.

Figure 1:
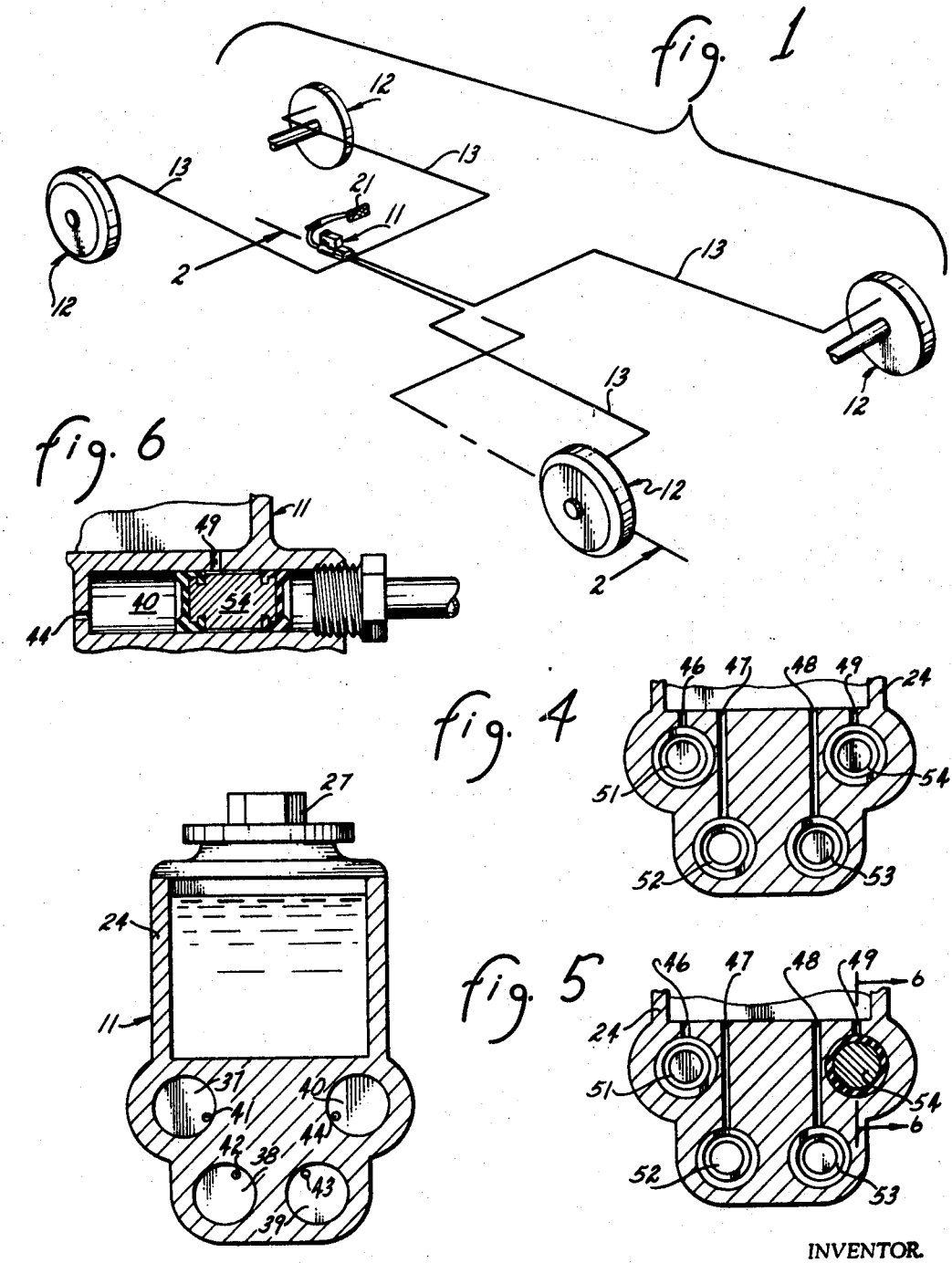
FIG. 1 is a schematic view of a brake system produced in accordance with my invention.

In the schematic view shown in FIG. 1, I provide a master cylinder assembly 11 shown in enlarged longitudinal section in FIG. 2 together with four wheel assemblies 12 to each of which a hydraulic line indicated generally by the reference character 13 extends, the hydraulic line 13 in each instance being provided with hydraulic fluid under pressure in a controlled manner as part of the system of the present invention. FIG. 2 also shows an enlargement of one of the wheel assemblies and also shows one of the hydraulic lines 13.

For a full understanding of the system, reference will first be made to the master cylinder assembly 11, as I have called it for convenience, which master cylinder assembly, however, includes floating pistons in separate cylinders forming a part of a secondary system including the lines 13 and the wheel cylinders operating the brakes of the individual wheel brake assemblies as will be explained.

Referring now to the master cylinder assembly 11, it embodies a general frame portion 16 with a mounting support 17 for attachment for a suitable part of the automobile frame in a manner conventional in the art. A cylindrical portion 18, which may be considered the master cylinder proper, has a master piston 19 reciprocable therein by the action of a foot brake 21 of conventional type (see FIG. 1). A rod 22 moved to the right as seen in FIG. 2 when the foot pedal 21 is depressed actuates the master piston 11 against the action of a coil spring 23 under compression to return the piston when the brake pedal is released. Thus, actuation of the brake pedal 21 forces hydraulic fluid forwardly under pressure in the primary part of the system. The hydraulic fluid is contained in a hydraulic fluid reservoir 24 mounted integrally with the frame 16 and containing hydraulic fluid suitable to a level shown at 26 and capable of being replenished through removal of a filler cap 27. The hydraulic fluid flows as required from the reservoir 24 through a supply opening 28 to that portion of the cylinder in advance of the piston port 19. The master piston may be of any suitable conventional type containing a rubber cup 29 which is expandable to seal against the walls of the cylinder 18 so that there will be no appreciable leakage of hydraulic fluid on forward movement of the piston and after the opening to the port 28 is covered. The piston 19 also carries a rear sealing ring 31. When forced to its rearmost position by the compression spring 23, it engages against a cover plate 32 held in position by a clamping ring 33, through which the rod 22 projects. In accordance with a common practice, also, any leakage which may occur past the cup 29 is trapped in an annular recess 34 and can move back and forth to the reservoir 24 through a blind port 36. This arrangement also serves to lubricate the hydraulic piston without permitting leakage.

Forwardly of master cylinder 18 are a plurality of smaller secondary cylinders 37, 38, 39, and 40, said secondary cylinders communicating with the master cylinder through longitudinal ports 41, 42, 43, and 44. The smaller secondary cylinders 37–40 respectively are in communication with the reservoir of hydraulic fluid through vertical passageways 46, 47, 48, and 49 respectively. Each of the smaller secondary cylinders is provided with a floating piston and they are numbered for convenience of identification in the drawings, 51, 52, 53, and 54. One of these floating pistons is shown in section in FIGS. 2 and 6 and it will be noted that they have a sealing cup on each end so that regardless of the direction of movement, they will cause the hydraulic fluid in their path to be pushed forwardly with a minimum of leakage. Thus, each of the smaller secondary cylinders is connected with a line 13 leading to a wheel assembly.

An illustrative showing of a wheel assembly utilizable with the system of my present invention appears in FIG. 2. Here a brake drum 55 has a usual friction surface adapted to be engaged by two brake shoes 56 having suitable linings 56a pivoted at 57 and 58 positioned by an adjusting device 59 of usual type. A spring 61 helps to maintain ends of the shoes against the fulcrum points 57 and 58. A wheel cylinder 62 receives hydraulic fluid under pressure from the line 13 by a conventional connection (not shown in detail in the drawing but utilizing conventional brake system structure). In accordance with a common practice, the wheel cylinder has end seals 63, a pair of pistons and sealing cups (not shown) operating projecting brake actuating rods 64 which engage between the two brake shoes and force them apart when the wheel cylinder is energized by the admission of hydraulic fluid under pressure. This action applies greater tension to the spring 65, so that when pressure is relieved by withdrawing one's foot from the pedal 21, the springs 65 function to return the brake shoes to the position shown in FIG. 2, out of contact with the brake drum. A pin 66 anchors one end of springs 65, the opposite ends being attached to the brake shoes, and acts as a stop for the free or unpivoted ends of the brake shoes.

I have already noted that when the primary hydraulic system is actuated by movement of the master piston 19, the floating pistons will be forced to the right, looking at FIG. 2, where they will almost immediately seal the ports 46–49 inclusive to thereby force hydraulic fluid under pressure to and through the lines 13 to actuate the wheel cylinders 62. When the springs 65 recoil, however, hydraulic fluid is forced out of the wheel cylinder 62 and in a reverse direction through the lines 13 to move the secondary pistons 51–54 inclusive in a lefthand direction, looking at FIG. 2, until the ports 46–49 inclusive are uncovered. This action assures that hydraulic fluid can again flow into the secondary hydraulic system to replace any slight leakage which might possibly occur any place in the secondary system. Thus, as long as no significant leak occurs anywhere in the system, each of the wheels will receive substantially the same braking action and the floating pistons will continue to reciprocate together, first in a direction to apply all of brakes on the vehicle, and then in an opposite direction as the brakes on the vehicle are released. From the above description, it will be obvious that from the standpoint of the driver as well as from the standpoint of a brake mechanic, the system of the present invention functions substantially identically with the present standard simple hydraulic brake system, except for certain exceptions, as will be explained.

Looking at FIG. 6, we see the floating piston 54 in approximately the forward position which it will occupy when the brakes are applied and the brake linings are new or adjusted to maximum brake action. The other floating pistons will be in the same general position if the system is working well. As friction material gradually wears, however, the floating pistons will move further and their master cylinders will be further actuated; but springs 65 will always return the floating pistons to the point shown in FIG. 2 where fluid can be replenished from the reservoir. The ports or passageways 46–49, however, are never uncovered when the floating pistons are in a forward actuated position such as shown in FIG. 6.

While the compound hydraulic brake system of my invention normally functions, for all practical purposes, as does a simple hydraulic brake system, it provides an entirely new function, however, if a major leak should occur in any part of the secondary system, such as in a wheel cylinder, in one of the lines 13 or in any of the connections involved. In such an event, there will be insufficient fluid to return the floating piston in the part of the secondary system in which the leak occurs to a position far enough to uncover its port connecting its cylinder to the reservoir 24, and this particular floating piston will then become inoperative, while the other floating pistons remain operative, and may remain, for example, in the position of piston 54 as shown in FIG. 6.

For the purpose of making this function clear, comparison may be made between FIGS. 2 and 4 on the one hand and FIGS. 5 and 6 on the other hand. In FIG. 2, the two pistons shown are entirely retracted, and the ports 48 and 49 open. Similarly, in FIG. 4 the ports 46–49 are shown open and all of the secondary pistons are shown in elevation in positions where the ports will remain open. In FIG. 2, it is also obvious that the ports 46, 47, 48 and 49 are immediately in front of the floating pistons, and these ports are covered as soon as the floating pistons are advanced only slightly.

By comparison in FIG. 5, three of the pistons, viz. 51, 52, and 53, are shown in elevation where they have uncovered their ports 46, 47 and 48, but piston 54 has remained in a position to seal port 49 as shown by the fact that floating piston 54 appears in section in this view. This function should already have become clear by reference to FIG. 6. In this latter figure, it appears obvious that when a floating piston has advanced as far as possible, the port connecting its cylinder to the reservoir 24 will remain covered. In this view, it is assumed that a leak of sufficient magnitude occurred so that piston 54 was not returned even partially. Thus, even if there were not enough hydraulic fluid remaining in one of the subsystems to return the floating piston at all, its foremost position on actuation would keep its associated port closed because the parts are dimensioned to maintain the ports 46–49 inclusive closed when the system is in operation in the course of applying the brake 21. It is also obvious that any substantial leakage would prevent a floating piston from returning far enough to uncover its port. Thus, the system would not only continue to operate but hydraulic fluid loss is held to a minimum.

Those skilled in the repair and maintenance of hydraulic brakes understand that if a wheel cylinder should leak, for example, and require replacement, there will be a loss of fluid in the hydraulic line, and it is a common practice to provide a small bleeder hole in a wheel cylinder normally closed by a threaded plug, so that when the plug is removed, the foot brake can be pumped up and down to force any air which may have entered the line out through the bleeder hole, and continue such pumping until discharge of hydraulic fluid through the bleeder hole will assure the mechanic that all air in the line has been eliminated. It is commonly necessary to bleed all four wheel cylinders.

Looking at FIG. 2, I apply in the location usually occupied by the bleeder hole in the wheel cylinder 62, a check valve 67 with a bleeder opening closed by a plug 68 and removable by an ordinary screw driver. Thus, if a leak should develop in any part of the secondary system, such as one requiring replacement of a wheel cylinder, oil can be replaced in a subsystem by removing plug 68, inserting the outlet portion of a hydraulic fluid "gun" into the opening in the check valve 67 and forcing hydraulic fluid through the wheel cylinder line 3 and into a cylinder 37–40, until the floating piston is forced back to the position shown in FIG. 2 and fluid bubbles up through the port (46–49) and all air has been removed from the system.

It is apparent from the above description that the compound hydraulic brake system of the present invention, while compounded in principle, function and structure, is not compounded in pressure. It provides a complete and separate hydraulic brake line for each wheel, but still has complete hydraulic equalization. The assembly comprises two separate fluid stages. The fluid from the large piston operates only the four small floating pistons. This is the primary fluid stage, and the fluid never leaves this one primary unit. The secondary fluid stage is represented by the connections and fluid between the floating pistons and the wheel cylinders. As in the case of the primary stage, so also the fluid in the secondary stage never leaves this stage. All cylinders are provided with fluid, however, from the same reservoir. The floating pistons act as separators between the first and second fluid stages. The rubber 29 of the primary piston is held in place by spring 23. There are rubber cups on both ends of the floating pistons, and they are held in place by the grooves near the ends of the floating pistons, as the drawings show.

In operation, when the brakes are applied, the large primary piston will move, and because the floating pistons are controlled by the larger piston and together have approximately an equal area, they move about an equal amount. When the floating pistons first start to move, they cut off their own individual brake fluid supply. As they continue to move, they also expand their wheel brake cylinders and the spring in each separate wheel brake system. It is the function of the brake springs and wheel cylinders to return the floating pistons to original starting position. If a line is broken and fluid escapes, the floating cannot be returned, and fluid will remain cut off in part of the secondary system, and there will be no effect on the other wheel brakes. As explained, the floating piston can be forced back by an oil can gun, and this may be done when the system is new or if the secondary stage has been repaired.

In order to bleed any wheel line, all that is required is to add fuel to the line through this wheel brake fitting, thus washing the air bubble into the master cylinder where it will escape.

In order that those skilled in the art might understand the invention and be able to practice it, I have shown specific details of one system embodying the features of the present invention, including a brake drum providing a friction surface, a particular conventional type of brake shoe, and a conventional type of wheel cylinder 62 and with all four wheel brakes actuated by one master cylinder and piston. Those skilled in the art will understand, however, that modifications are possible within the scope of the invention as claimed.

I claim.
1. In a compound hydraulic brake system:
(a) a primary master cylinder assembly including a master cylinder and master piston,
(b) a source of hydraulic fluid,
(c) means providing a fluid passageway between said source and said piston immediately forward of the same when the said master piston is retracted,
(d) a plurality of secondary cylinders in said master cylinder assembly but connected hydraulically thereto,
(e) a floating piston in each of said secondary cylinders,
(f) means providing a secondary fluid passageway between said hydraulic fluid source and said secondary cylinders, said secondary passageways being forward of said floating pistons when said pistons are retracted,
(g) a wheel brake cylinder for each of said floating pistons,
(h) each said brake cylinders having a friction surface and at least one brake member engageable against said fricton surface,
(i) a wheel cylinder functionable when energized by hydraulic fluid to force said brake member against the said friction surface,
(j) a hydraulic line connecting each such secondary cylinder to a wheel cylinder to energize the same when the master cylinder is actuated, and
(k) a spring normally biasing said brake member away from said surface, said spring being sufficiently strong to de-energize its wheel cylinder and hydraulically return its said associated floating piston to retracted position when the master piston is retracted,
(l) whereby a floating piston will remain in position to close its associated secondary passageway to prevent continued loss of hydraulic fluid if a leak should develop in a subsystem associated with one wheel, but brake subsystems associated with remaining wheels will continue to function, including a check valve in each wheel cylinder, and a releasable plug associated therewith, whereby a pressure gun filled with hydraulic fluid may be used to introduce hydraulic fluid under pressure to fill a line associated with it to force its floating piston to unactuated position and fill the entire line with hydraulic fluid.

References Cited

UNITED STATES PATENTS

| | | | |
|---|---|---|---|
| 1,652,232 | 12/1927 | Blasdel | 60—54.6 X |
| 1,795,818 | 3/1931 | Allred et al. | 60—54.5 X |
| 1,825,013 | 9/1931 | Patton | 188—152.14 |
| 2,056,940 | 10/1936 | Francis et al. | 60—54.5 |
| 2,146,545 | 2/1939 | Leighton | 60—54.6 |
| 2,209,343 | 7/1940 | Masteller | 60—54.6 X |
| 2,583,825 | 1/1952 | Felt | 60—54.5 |
| 2,585,511 | 2/1952 | Sparks et al. | 60—54.6 |
| 2,762,199 | 9/1956 | Major | 60—54.6 |
| 2,067,697 | 1/1937 | Fontaine | 60—54.5 |

MARTIN P. SCHWADRON, *Primary Examiner.*

ROBERT R. BUNEVICH, *Assistant Examiner.*